United States Patent [19]
Zimmer et al.

[11] Patent Number: 5,905,345
[45] Date of Patent: May 18, 1999

[54] MULTI-FUNCTIONAL APPARATUS EMPLOYING AN INTERMITTENT MOTION MECHANISM

[75] Inventors: William Carl Zimmer, Columbus; James Wayne Gibson, Steens, both of Mich.

[73] Assignee: UT Automotive Dearborn, Inc., Dearborn, Mich.

[21] Appl. No.: 09/050,324

[22] Filed: Mar. 30, 1998

Related U.S. Application Data

[62] Division of application No. 08/430,388, Apr. 28, 1995.

[51] Int. Cl.$^6$ ........................................ H02K 7/14
[52] U.S. Cl. ........................... 318/4; 318/9; 318/445; 343/714
[58] Field of Search ................... 318/280–288, 318/3, 4, 9–15, 445–470; 343/711, 713, 714, 715

[56] References Cited

U.S. PATENT DOCUMENTS

| | | |
|---|---|---|
| 2,271,207 | 1/1942 | Rhein . |
| 2,345,778 | 4/1944 | Lammeren et al. . |
| 2,615,945 | 10/1952 | Jaeschke . |
| 2,722,617 | 11/1955 | Cluwen et al. . |
| 2,953,802 | 9/1960 | Ziegler . |
| 2,959,803 | 11/1960 | Ziegler . |
| 3,163,791 | 12/1964 | Carlson . |
| 3,361,005 | 1/1968 | Carpenter . |
| 3,361,947 | 1/1968 | Schlebusch . |
| 3,516,610 | 6/1970 | Stevens . |
| 3,523,204 | 8/1970 | Rand . |
| 3,619,676 | 11/1971 | Kawakami . |
| 3,659,128 | 4/1972 | Danek . |
| 3,705,520 | 12/1972 | Carpenter . |
| 3,858,922 | 1/1975 | Yamanaka . |
| 3,927,436 | 12/1975 | Inoue et al. . |
| 4,065,234 | 12/1977 | Yoshiyuki et al. . |
| 4,450,390 | 5/1984 | Andrei-Alexandru et al. . |
| 4,478,004 | 10/1984 | Andrei-Alexandru et al. . |
| 4,507,711 | 3/1985 | Ono et al. . |
| 4,630,178 | 12/1986 | Mugford et al. . |
| 4,701,972 | 10/1987 | Saito . |
| 4,724,760 | 2/1988 | Bubley . |
| 4,793,640 | 12/1988 | Stewart, Sr. . |
| 4,875,053 | 10/1989 | Harada . |
| 4,990,929 | 2/1991 | Nakase et al. .......................... 343/715 |
| 5,019,834 | 5/1991 | Suga ........................................ 343/877 |
| 5,189,435 | 2/1993 | Yarsunas et al. ....................... 343/903 |
| 5,201,391 | 4/1993 | Arai et al. ............................... 192/58.4 |
| 5,214,440 | 5/1993 | Takahashi et al. . |
| 5,315,735 | 5/1994 | I-Shin . |
| 5,373,605 | 12/1994 | Austin . |
| 5,414,436 | 5/1995 | Shinkawa et al. ...................... 343/715 |
| 5,427,345 | 6/1995 | Yamakami et al. . |
| 5,462,337 | 10/1995 | Yamakami . |
| 5,528,959 | 6/1996 | Yamakami . |
| 5,691,586 | 11/1997 | Yonnet et al. . |
| 5,844,382 | 12/1998 | Dan . |

FOREIGN PATENT DOCUMENTS

| | | |
|---|---|---|
| 0 345 002 A2 | 6/1989 | European Pat. Off. . |
| 1281424 | 12/1961 | France . |
| 28 16 207 A1 | 10/1979 | Germany . |
| 2 153 218 | 8/1985 | United Kingdom . |

OTHER PUBLICATIONS

Patent Abstracts of Japan, vol. 016, 7–438 (M–1309), Sep. 11, 1992 for JP Patent Publication No. 04151351.

P. 100, *Machine Design*, 60 (1988) Oct. 13, No. 24, Cleveland, Ohio, US.

European Search Report of Appln. No. EP 97 40 3128 dated Feb. 6, 1998, 3 pages.

*Primary Examiner*—Brian Sircus
*Attorney, Agent, or Firm*—Harness, Dickey & Pierce, P.L.C.

[57] ABSTRACT

A multi-functional apparatus employs an intermittent motion mechanism. An electromagnetic device selectively causes movement of the intermittent motion mechanism thereby moving a mechanical device coupled thereto. In another aspect of the present invention, a single electric motor selectively actuates two or three intermittent rotary motion mechanisms thereby causing separate mechanical devices coupled thereto to operate within an automotive vehicle.

20 Claims, 15 Drawing Sheets

MULTI-FUNCTIONAL APPARATUS EMPLOYING AN INTERMITTENT MOTION MECHANISM

CROSS REFERENCE TO RELATED APPLICATIONS

This is a division of U.S. patent application Ser. No. 08/430,388, filed Apr. 28, 1995.

This application relates to the following simultaneously filed patent applications which are incorporated by reference herewithin: U.S. application Ser. No. 08/431,148 entitled "Multi-Functional Apparatus Employing an Electromagnetic Device" by H. Winston Maue and Eric J. Krupp; and U.S. application Ser. No. 08/431,149 entitled "Control System for an Automotive Vehicle Multi-Functional Apparatus" by H. Winston Maue, Shawn P. Slusser, Jeffrey L. Kulczycki and Ronald Zaleski.

BACKGROUND OF THE INVENTION

This invention relates generally to multi-functional apparatuses and specifically to a multi-functional apparatus employing an intermittent motion mechanism for use in an automotive vehicle.

Almost all automotive vehicles have a single or a pair of windshield wiper assemblies. These assemblies traditionally include rubber wiper blades mounted upon claw brackets. These claw brackets are attached to wiper arms mounted upon rotating shafts. These shafts are either directly driven by electric motors or driven by a single electric motor which actuates series or parallel-coupled four-bar linkage mechanisms. It is further known to provide a wiper system, in combination with a wash device, to clean headlamps for automotive vehicles.

It is also common to employ a window wiper assembly for cleaning rear windows of automotive vehicles. Typically, these types of rear window wiper assemblies include a wiper blade mounted upon a bracket which is coupled to a wiper arm. The wiper arm is attached to a wiper shaft rotatably driven in a cyclical oscillating manner by a helical gear. A reversible, fractional horsepower, dc electric motor serves to actuate the helical gear through an armature shaft-mounted worm gear enmeshed therewith. This type of rear window wiper arrangement is usually mounted upon a pivoting liftgate of a minivan, station wagon, sport-utility vehicle or the like. Examples of conventional window wiper assemblies and motor mechanisms are disclosed with the following U.S. Patents: U.S. Pat. Nos. 4,893,039 entitled "Windshield Wiper Motor" which issued to Isii on Jan. 9, 1990; 4,878,398 entitled "Driving Device for Window Wiper of Motor Vehicles" which issued to Heinrich on Nov. 7, 1989; 4,336,482 entitled "Rear Window Wiper Motor Control" which issued to Goertler et al. on Jun. 22, 1982; 4,259,624 entitled "Arrangement for Wiping a Vehicle Window" which issued to Seibicke on Mar. 31, 1981; 3,694,723 entitled "Motor Vehicle Windshield Wiper Having a Parking Position Outside the Wiper Area" which issued to Schneider et al. on Sep. 26, 1972; and, 3,665,772 entitled "Windshield Wiper Motor Link Depressed Park Mechanism" which issued to Beard et al. on May 30, 1972. All of these patents are incorporated by reference herewithin.

Some conventional vehicles also provide a rear window release lock or latch, actuated by a solenoid, which can be unlocked to allow for upward pivotal movement of the rear window in relation to the otherwise stationary liftgate. In combination therewith, a separate liftgate lock is often mounted upon the liftgate door for fastening the liftgate to the body to prevent inadvertent pivotal opening. This liftgate lock is traditionally operated by manual key or handle rotation, or through a separate electric motor or solenoid.

Additionally, separate motors and solenoids are required to actuate passenger door locks, an antenna retraction mechanism, headlamp cover retraction mechanisms, a fuel filler door lock and other similar functions. The traditional need for such a multiplicity of electromagnetic devices has increased the automotive vehicle weight and cost while further proving difficult to package within the often small spaces provided. This added weight is especially detrimental when the window wiper mechanism, rear window lock and liftgate lock, as well as their distinct respective electromagnetic devices, are all incorporated within the pivoting liftgate. Not only is the piece cost, increased due to this multiplicity of electromagnetic devices, but the assembly cost, part number proliferation and handling costs, electrical wiring costs, objectional motor noise, and failure modes are increased.

SUMMARY OF THE INVENTION

In accordance with the present invention, the preferred embodiment of a multi-functional apparatus employs an intermittent motion mechanism. An electromagnetic device selectively causes movement of the intermittent motion mechanism thereby moving a mechanical device coupled thereto. In another aspect of the present invention a pair of intermittent rotary motion mechanisms are selectively rotated by a single reversible electric motor. In a further aspect of the present invention, a single electric motor selectively actuates three intermittent rotary motion mechanisms thereby causing three mechanical devices coupled thereto to operate.

The multi-functional apparatus of the present invention is advantageous over conventional systems since the present invention combines many different functions into a single apparatus. For example, the present invention multi-functional apparatus replaces the traditional separate rear wiper motor, liftgate lock motor and rear window lock solenoid. Accordingly, the present invention multi-functional apparatus significantly reduces the piece cost, assembly cost, part proliferation and handling costs, wiring costs, and battery current consumption as compared to conventional constructions. Furthermore, the multi-functional apparatus of the present invention significantly reduces weight and packaging space requirements while increasing the electrical and mechanical reliability of the affected systems. Objectional motor and solenoid noises are also reduced. Moreover, the present invention provides a means for mechanically locking the intermittent motion mechanisms and devices coupled thereto in fixed positions. Additional advantages and features of the present invention will become apparent from the following description and appended claims, taken in conjunction with the accompanying drawings.

DETAILED DESCRIPTION OF THE PREFERRED EMBODIMENT

Figure 1:
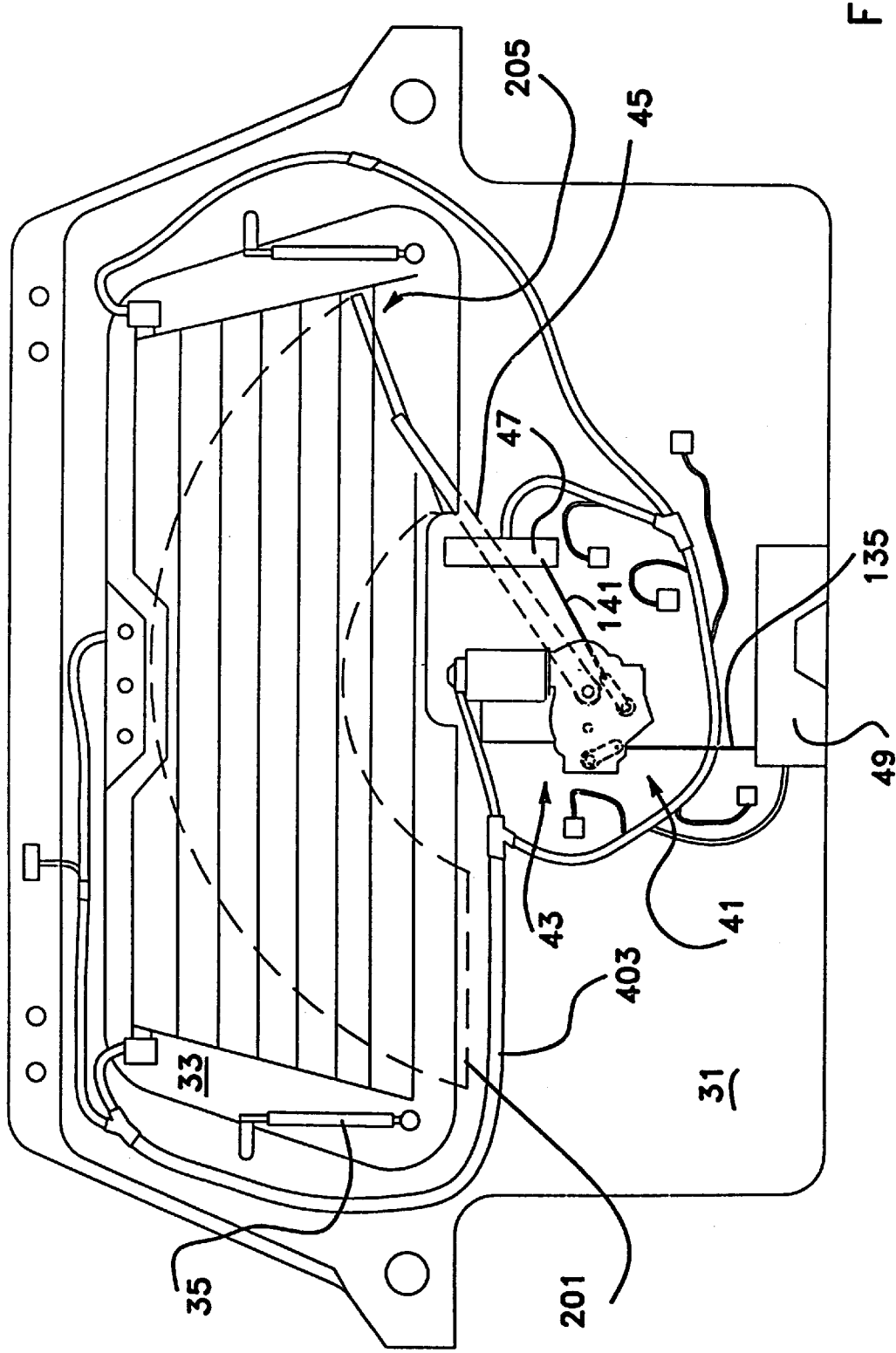
FIG. 1 is a front elevational view showing the preferred embodiment of a multi-functional apparatus of the present invention.

An automotive vehicle, such as a minivan or the like, has a rear liftgate door which can pivot about an upper pair of hinges coupled to the vehicle body structure. When the liftgate is pivoted to an open position, a cargo space is accessible from behind the vehicle. Such a liftgate is shown in FIG. 1. Liftgate 31 has a rear window or backlite 33 pivotable between a closed position, substantially flush with the outer surface of liftgate 31, to an open position about upper hinges. A pair of pneumatic cylinders 35 act to push window 33 toward the open position when a lower portion of window 33 is released. The preferred embodiment of a multi-functional apparatus 41 of the present invention is mounted upon an inner surface of liftgate 31. The majority of apparatus 41 is hidden by an interior trim panel (not shown). Apparatus 41 includes a central drive and power transmission unit 43, a window wiper assembly 45, a window release latch or lock 47 and a liftgate lock 49, all of which are mounted upon liftgate 31. Examples of such locks (employing separate solenoids or motors, which would be removed in order to couple the lock mechanism for use with the present invention) are disclosed within the following U.S. patents: U.S. Pat. Nos. 5,222,775 entitled "Power Operated Latch Device for Automotive Back Door" which issued to Kato on Jun. 29, 1993; 4,422,522 entitled "Inertial Lock for Vehicle Door Latch" which issued to Slavin et al, on Dec. 27, 1983; and, 3,917,330 entitled "Electric Lock Release" which issued to Quantz on Nov. 4, 1975; all of which are incorporated by reference herewithin.

Figure 2:
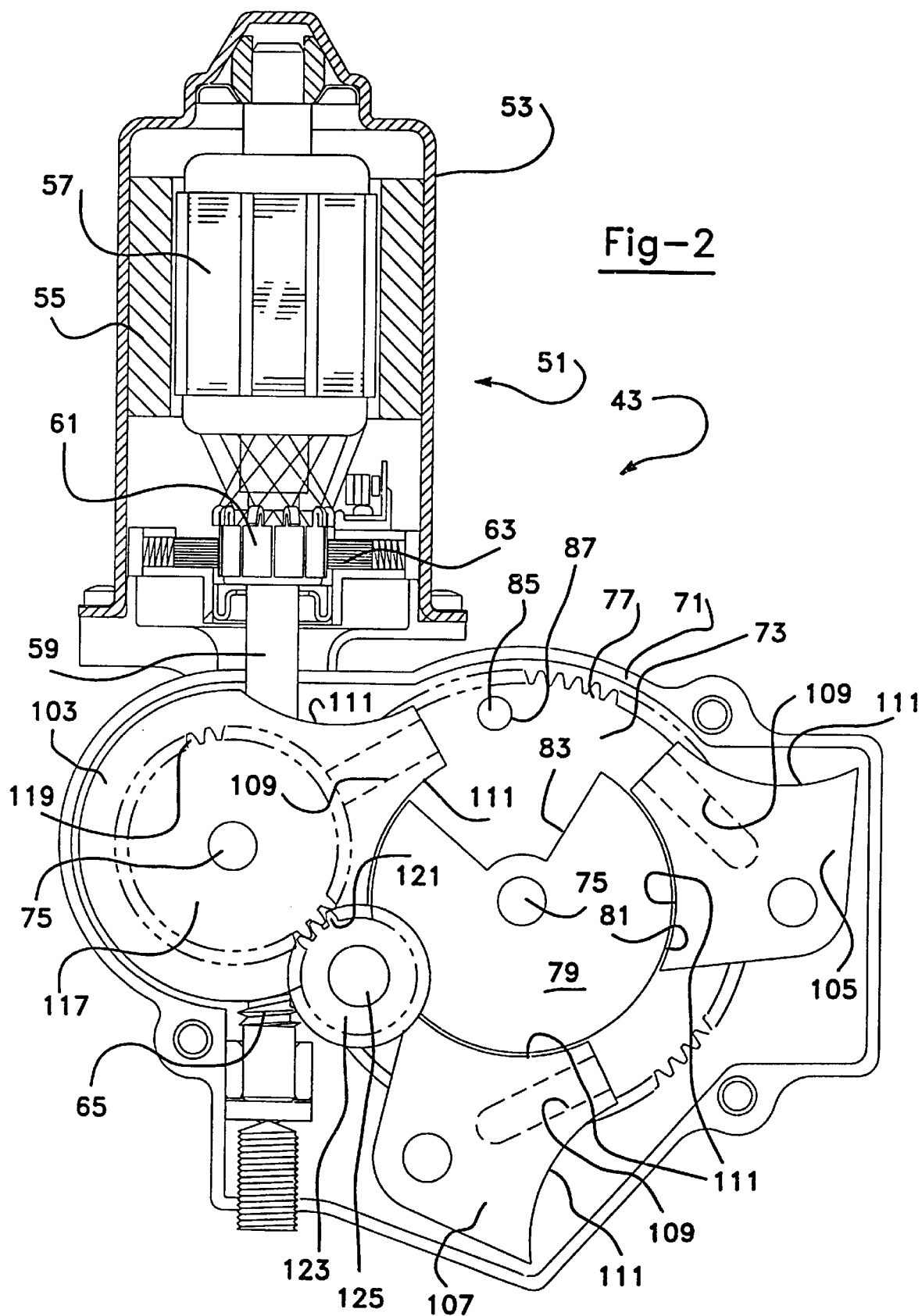
FIG. 2 is a rear elevational view, with portions broken away therefrom, showing the preferred embodiment multi-functional apparatus of the present invention.
Figure 3:
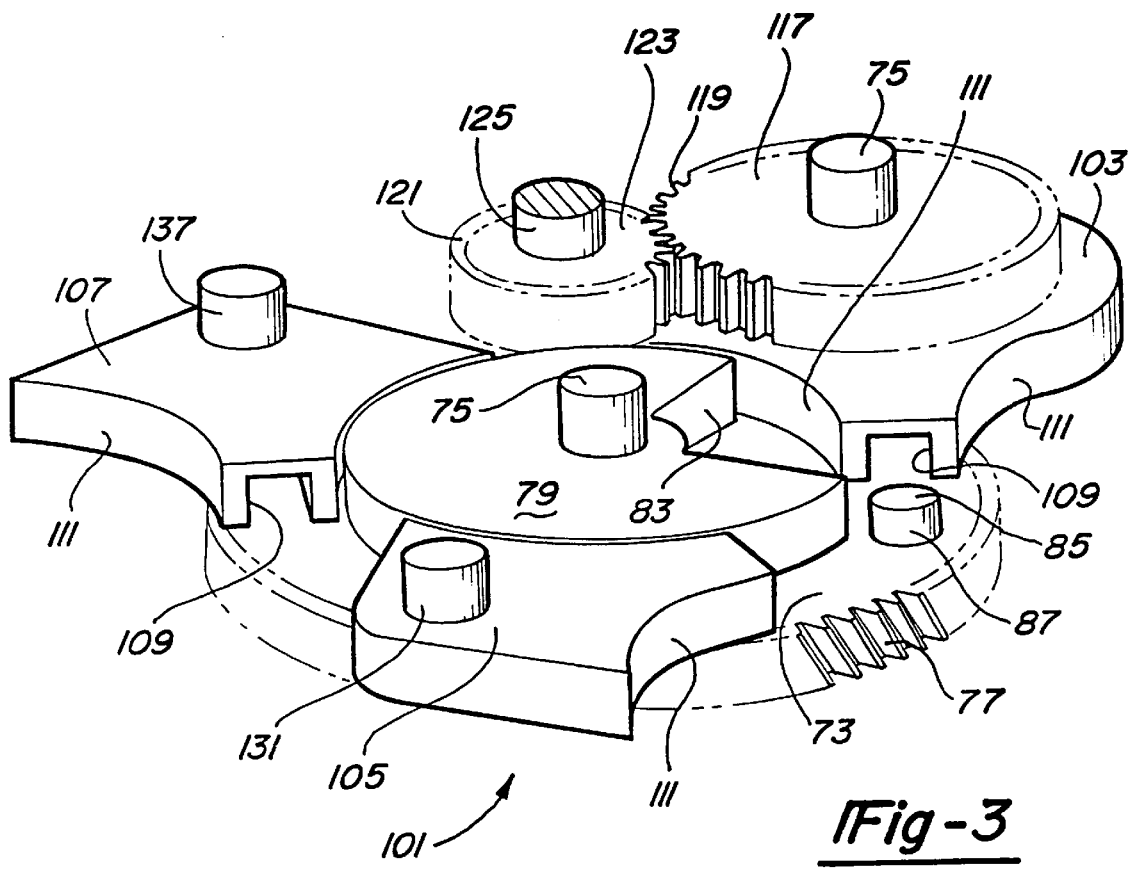
FIG. 3 is a perspective view showing a power transmission assembly employed in the preferred embodiment of the present invention multi-functional apparatus.
Figure 4:
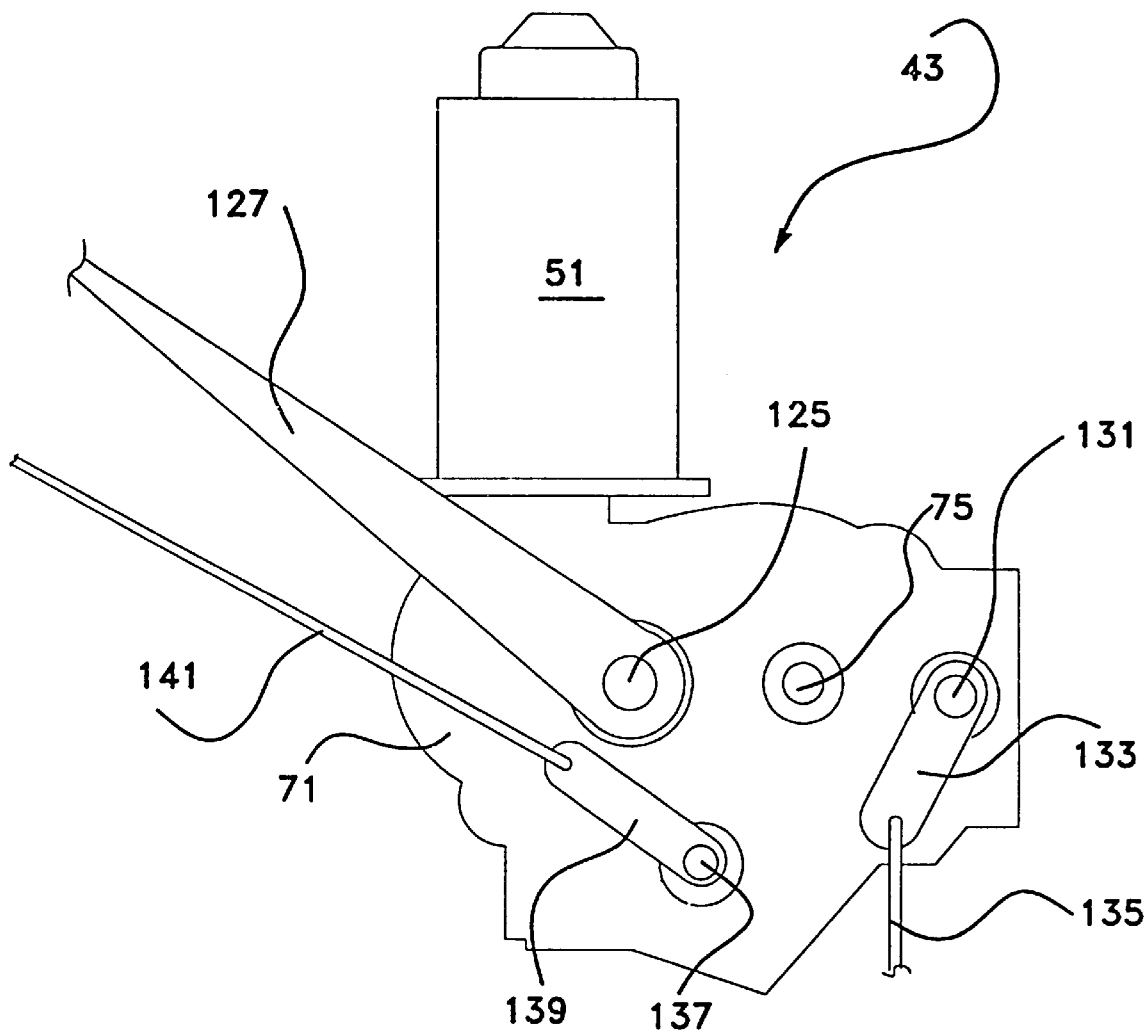
FIG. 4 is a fragmentary rear elevational view showing the preferred embodiment multi-functional apparatus of the present invention.

The construction of central drive and power transmission unit 43 is best illustrated in FIGS. 2–4. An electric motor 51 is of a conventional 12 volt fractional horsepower, dc electromagnetic variety having a metallic motor housing 53 within which are stationary permanent magnets 55, a rotatable armature 57 with wire windings, a rotatable armature shaft 59 joined to armature 57, a commutator 61 electrically connected to the wire windings and rotatable with armature shaft 59, a brush card assembly 63 and various electronic components, bushings and retainers. It will be appreciated to those skilled in the art that other electric motor constructions can readily be substituted for that shown. A worm gear segment 65 is provided upon a portion of armature shaft 59 extending beyond motor housing 53.

A gear housing 71 is also provided for receiving worm gear segment 65 and the immediately adjacent portions of armature shaft 59. A main helical gear 73 is also housed and rotatably journalled within gear housing 71. Gear housing 71 is preferably made from cast aluminum. A plurality of knurled steel journalling pins 75 are press fit or otherwise attached within machined openings of gear housing 71. The placement of these openings in relation to each other is important. Pins 75 can alternately be molded as part of plastic gears and cams.

Helical gear 73 has an external set of helically oriented teeth 77 projecting entirely therearound for meshing with worm gear segment 65. A drum 79 is mounted upon a face of helical gear 73 for rotating therewith. Drum 79 has a partially circular peripheral surface 81 interrupted by a clearance indentation 83. Drum 79 and helical gear 73 are coaxially aligned for rotation about their respective journalling pin 75. A drive pin 85 projects from a face of helical gear 73 substantially parallel to the adjacent journalling pin 75. Drive pin 85 has a cylindrical driving interface surface 87 thereabout. Of course, a rotatable sleeve may alternately surround drive pin 85. Other alternate driving interface means may be employed such as an integrally molded fingers screw, rivet, spring, ribs plural projections or other similar formations protruding from a face of peripheral portion of helical gear 73. Helical gear 73 is preferably injection molded from a polymeric material such as acetyl. An electrically conductive feedback disk 89 (see FIG. 12) is retained to an inside face of helical gear 73 through ultrasonically rolled welding or insert molding. Feedback disk 89 is comprised of a set of copper alloy or brass alloy stamped contacts which are provided with differing conductive and nonconductive patterns depending on the specific positional ranges as will be discussed in greater detail hereinafter.

A power transmission assembly 101 of central drive and power transmission unit 43 employs three intermittent rotary motion mechanisms or cams 103, 105 and 107. Each cam has a single, linear, external open channel 109 defined by driven interfacing surfaces or walls therein. Driving interface surface 87 of drive pin 85 is selectively engagable against the walls defining channels 109 of each cam. Each cam is rotatable about its respective journalling pin 75. Furthermore, partially circular external surfaces 111 of each cam register with the partially circular peripheral surface 81 of drum 79. A relatively tight tolerance on these registering surfaces of about 1–2 thousandths of an inch is preferably used. Thus, unless each cam is aligned with indentation 83 of drum 79, partially circular peripheral surface 81 of drum 79 will act to prevent rotation of each cam. However, when indentation 83 of drum 79 aligns with an individual cam, concurrently with drive pin 85 engaging within a channel 109 of the same cam, continued rotation of helical gear 73 will cause the selectively coupled cam to rotate therewith. Moreover, the selectively coupled cam will have increased rotational acceleration as drive pin 85 moves closer to journalling pin 75 within channel 109. This rotational acceleration, then deceleration, achieves a desirable inertial ramping up and ramping down effect such that potentially harmful inertial stresses and cyclical fatigue within the device coupled thereto are avoided. The diameter of drive pin 85 should match channel 109 width within half a thousandth of an inch.

Cam 103 additionally has a spur gear 117 stacked coaxially thereupon for simultaneous movement therewith. Spur gear 117 has a peripheral set of teeth 119 extending entirely therearound for enmeshing with a mating eternal set of teeth 121 extending entirely around a driven pinion gear 123. Pinion gear 123 rotates the output shaft. The window wiper shaft 125 extends from a rear face of pinion gear 123 for moving in concert therewith. Wiper shaft 125 is attached to pinion gear 123 through rivets, insert molding, knurled press fitting, et cetera. A window wiper arm 127 of wiper assembly 45 is mounted upon wiper shaft 125 in a conventional manner. Wiper shaft is preferably made from cold rolled steel. The system is designed to oscillate wiper assembly 45 at forty-five cycles per minute (round trip) but other cycle frequencies can be achieved.

A protuberance 131 projects from a rear face of cam 105 and engages with a lever 133 which, in turn, is attached to a liftgate lock rod 135. Protuberance 131, lever 133 and rod 135 are also considered to be lock couplings or coupling members. Lock connecting rod 135 is joined to liftgate lock 49 (see FIG. 1) for causing the mechanisms therein to move in response to movement of cam 105. Similarly, a protuberance 137 extends from and moves with a rear face of cam 107. A lever 139 is connected to protuberance 137 for moving therewith. A liftgate window release lock connecting rod 141 connects lever 139 to liftgate window release lock 47 (see FIG. 1) for causing window releasing movement thereof in response to selective movement of cam 107. Protuberance 137, lever 139 and connecting rod 141 are also defined as liftgate window release lock couplings or coupling members. Protuberances 131 and 137 are preferably secured to their respective levers 133 and 139 in a keyholed manner. Additional threaded nuts, push nuts, crimpings, cotter pins and washers or the like (not shown) may be employed to retain the levers to their protrusions. The cams, spur gear and pinion gear are preferably made from powdered metallic steel. Alternately, other coupling means may be employed such as cables, belts, chains, gear sets, multiple linkages, lack screws, rack and pinion gear sets or the like.

Figure 5:
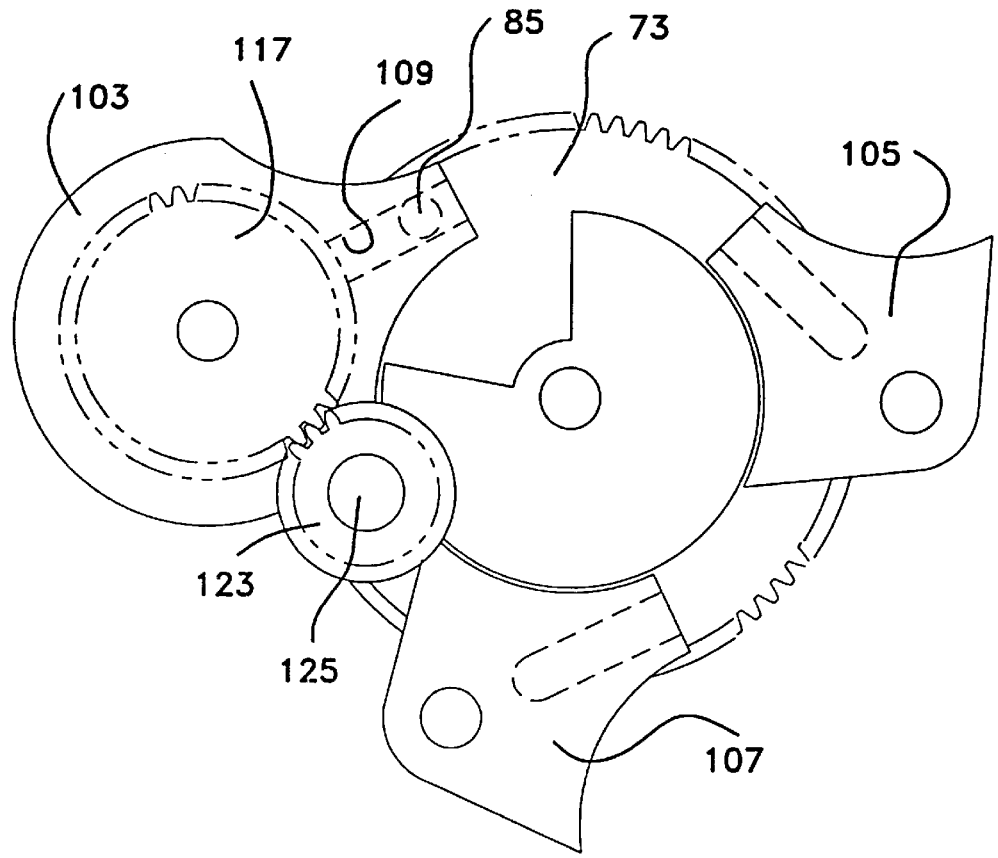
FIG. 5 is a diagrammatic rear view showing the power transmission assembly mechanisms of the preferred embodiment multi-functional apparatus of the present invention in the beginning of a wipe position.
Figure 6:
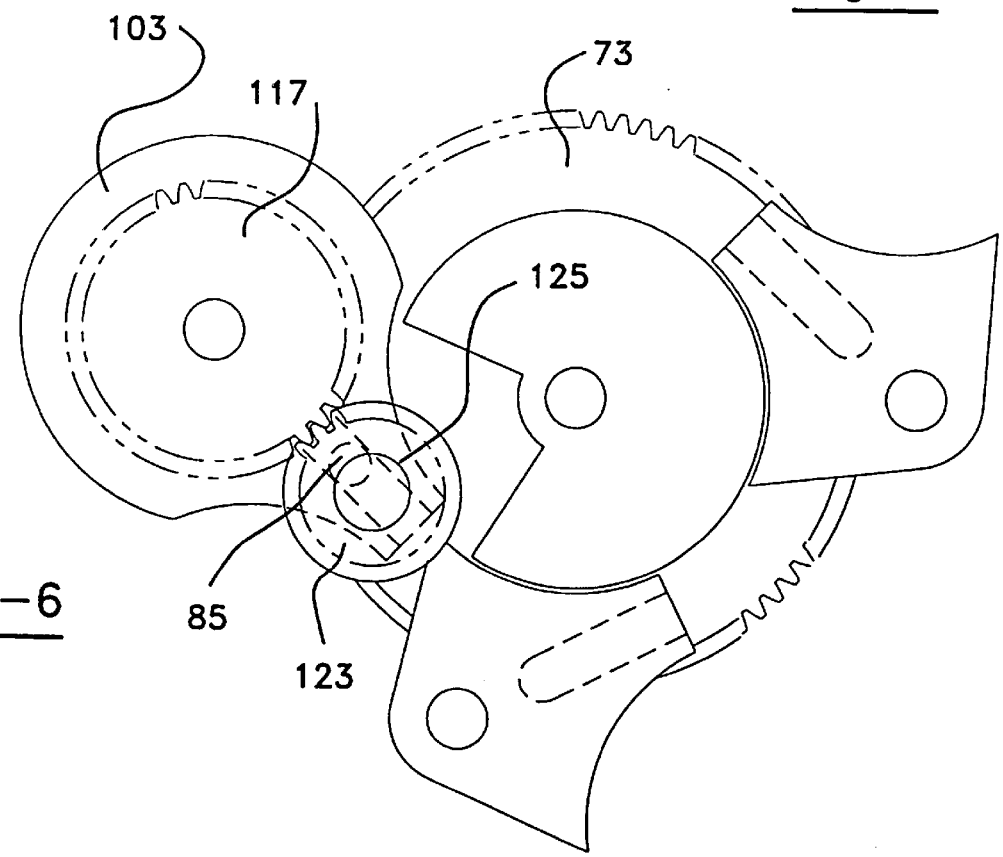
FIG. 6 is a diagrammatic rear view showing the power transmission assembly of the preferred embodiment multi-functional apparatus of the present invention at the end of one direction of a wiping motion.
Figure 7:
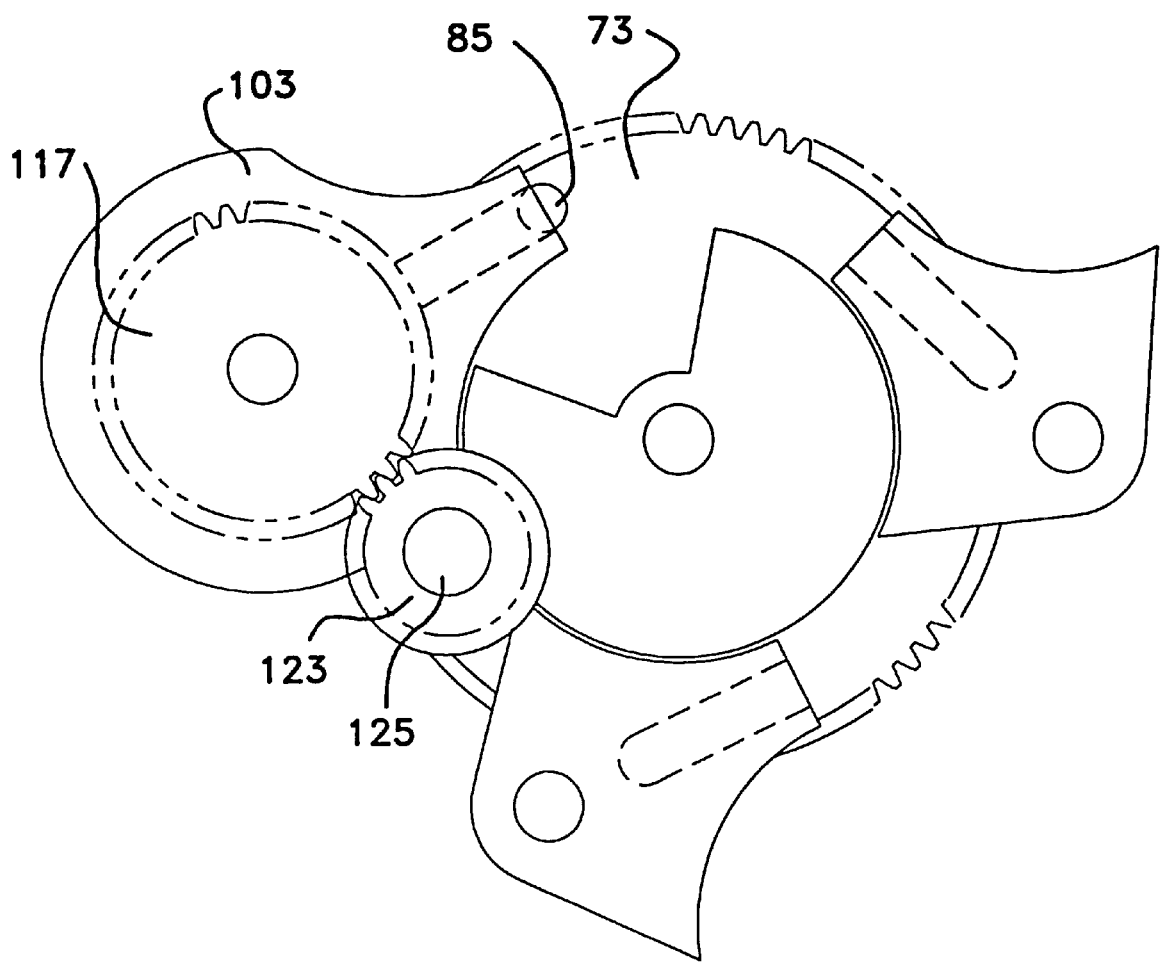
FIG. 7 is a diagrammatic rear view showing the power transmission assembly of the preferred embodiment multi-functional apparatus of the present invention at the end of the depressed park position.

The operation of the multi-functional apparatus of the present invention can best be understood by referring to FIGS. 5–12. In FIG. 5, drive pin 85 has partially entered channel 109 of cam 103. In this position, the wiper blade is moved 60 from a depressed park position 201 (see FIGS. 1 and 12) to the beginning of the window wipe range designated as position 203 (see FIG. 12). FIG. 6 shows helical gear 73, drive pin 85, cam 103, spur gear 117 and pinion gear 123 rotated 162° to the completion position 205 (see FIGS. 1 and 12) at the end of the window wipe range. The electrical polarity is then reversed to motor 51 (see FIG. 2) such that rotation of helical gear 73, drive pin 85, cam 103, spur gear 17, pinion gear 123 and wiper shaft 125 are reversed back to helical gear position 203 (see FIG. 12). Referring to FIG. 7, helical gear 73 is rotated such that drive pin 85 moves cam 103, spur gear 117, pinion gear 123, wiper shaft 125 and wiper assembly 45 to the depressed wiper arm parking position 201 (see FIGS. 1 and 12). The wiper blade is thus moved off of the rear liftgate window such that the wiper blade is supported on a bracket upon the liftgate door. This allows for free, noninterferred movement of the lift glass window as will be discussed hereinafter.

Figure 8:
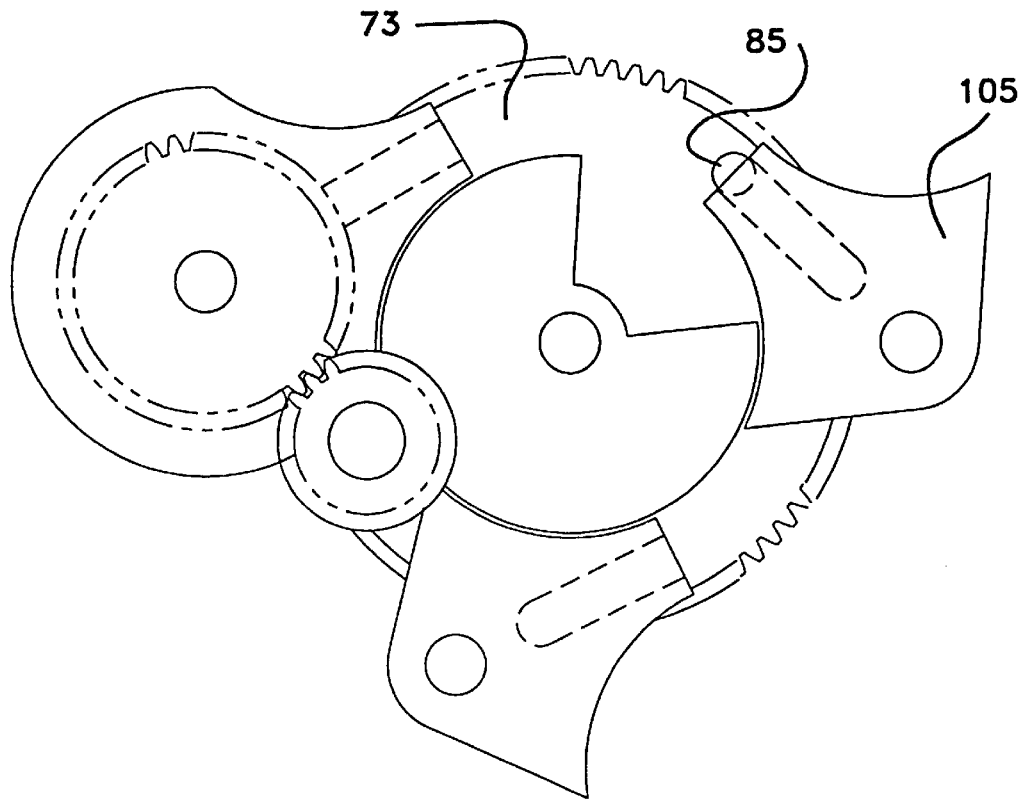
FIG. 8 is a diagrammatic rear view showing the power transmission assembly of the preferred embodiment multi-functional apparatus of the present invention at the beginning of a liftgate unlocking motion.
Figure 9:
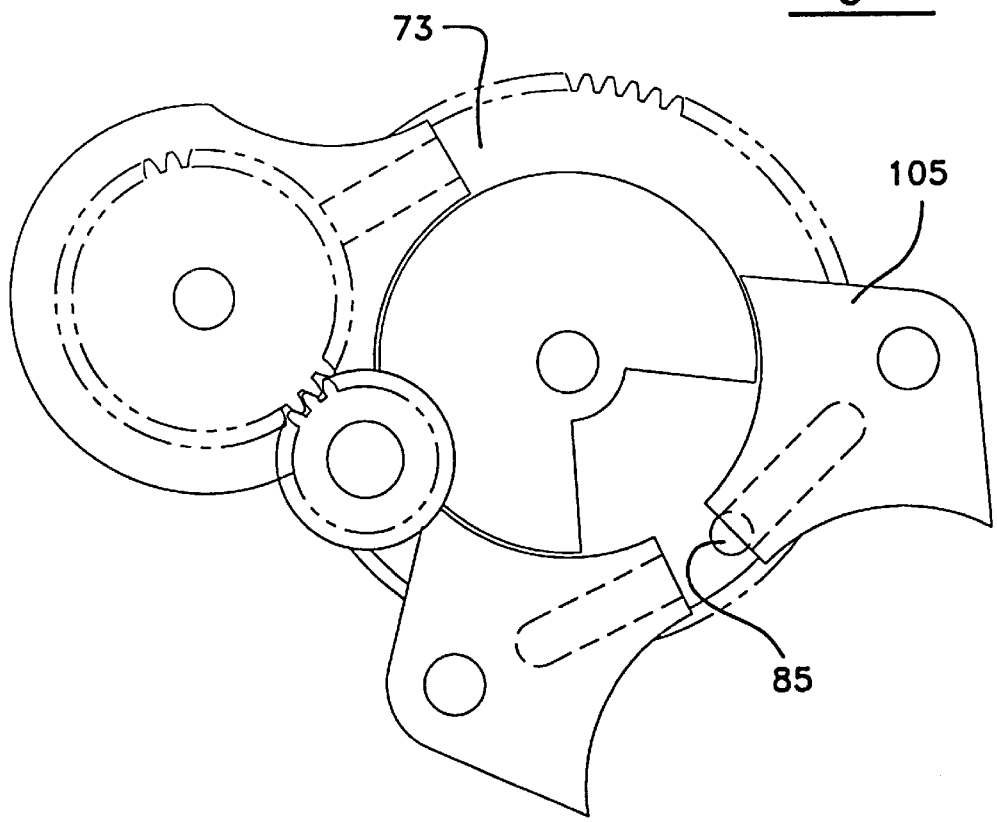
FIG. 9 is a diagrammatic rear view showing the power transmission assembly of the preferred embodiment multi-functional apparatus of the present invention at the completion of the liftgate unlocking motion.
Figure 12:
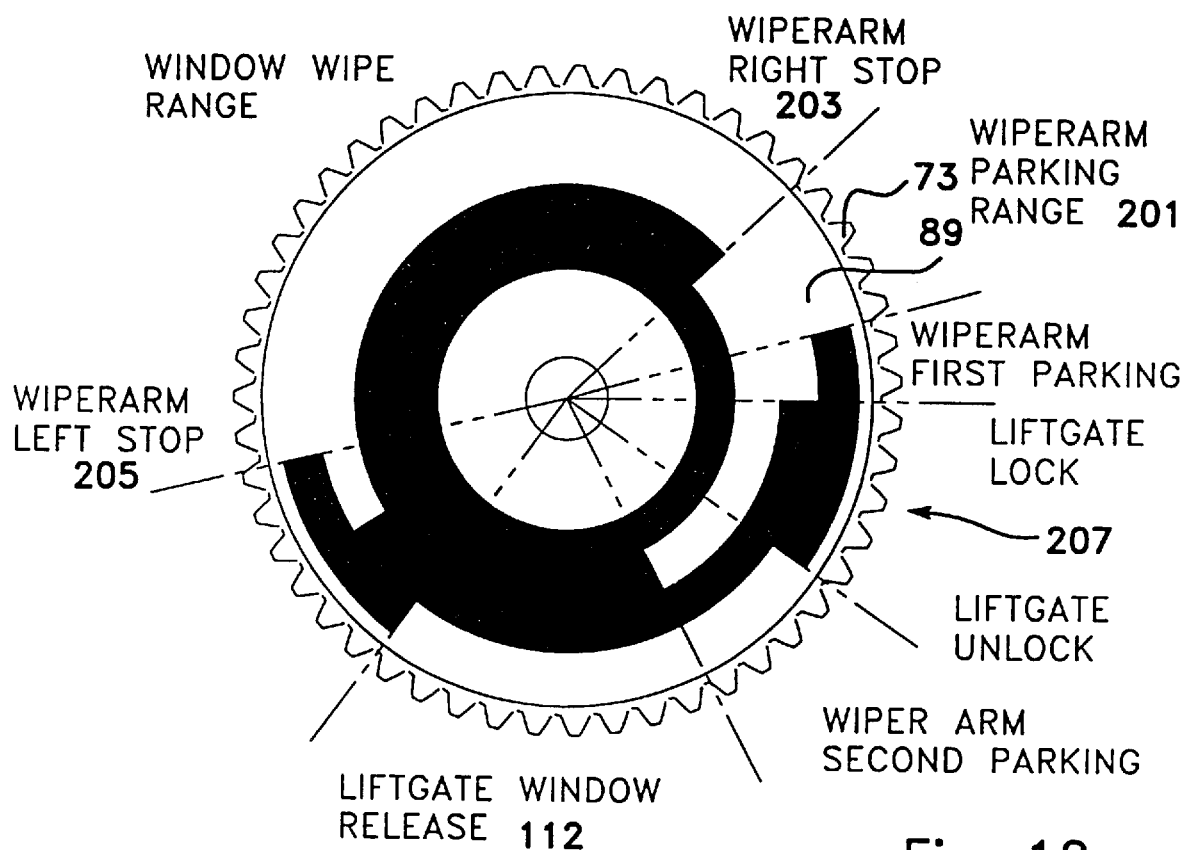
FIG. 12 is a diagrammatic front view showing a motor feedback circuit disk employed in the preferred embodiment multi-functional apparatus of the present invention.

FIG. 8 illustrates helical gear 73 and drive pin 85 moved to the beginning of a liftgate lock/unlock positional range 207 (see FIG. 12). Subsequently, FIG. 9 shows helical gear 73 and drive pin 85 rotated to the completion of the liftgate lock/unlock positional range 207. Clockwise movement (as illustrated) of helical gear 73 through range 207 causes cam 105 to move to an unlocked orientation thereby causing the couplings and liftgate lock 49 (see FIG. 1) associated therewith to also be moved from a locked orientation to an unlocked orientation. Motor 51 (see FIG. 2) can then be reversed to move helical gear 73 in a counterclockwise direction (as illustrated), this causes drive pin 85, cam 105, the couplings and liftgate lock 49 (see FIG. 1) to move from an unlocked orientation to a locked orientation.

Figure 10:
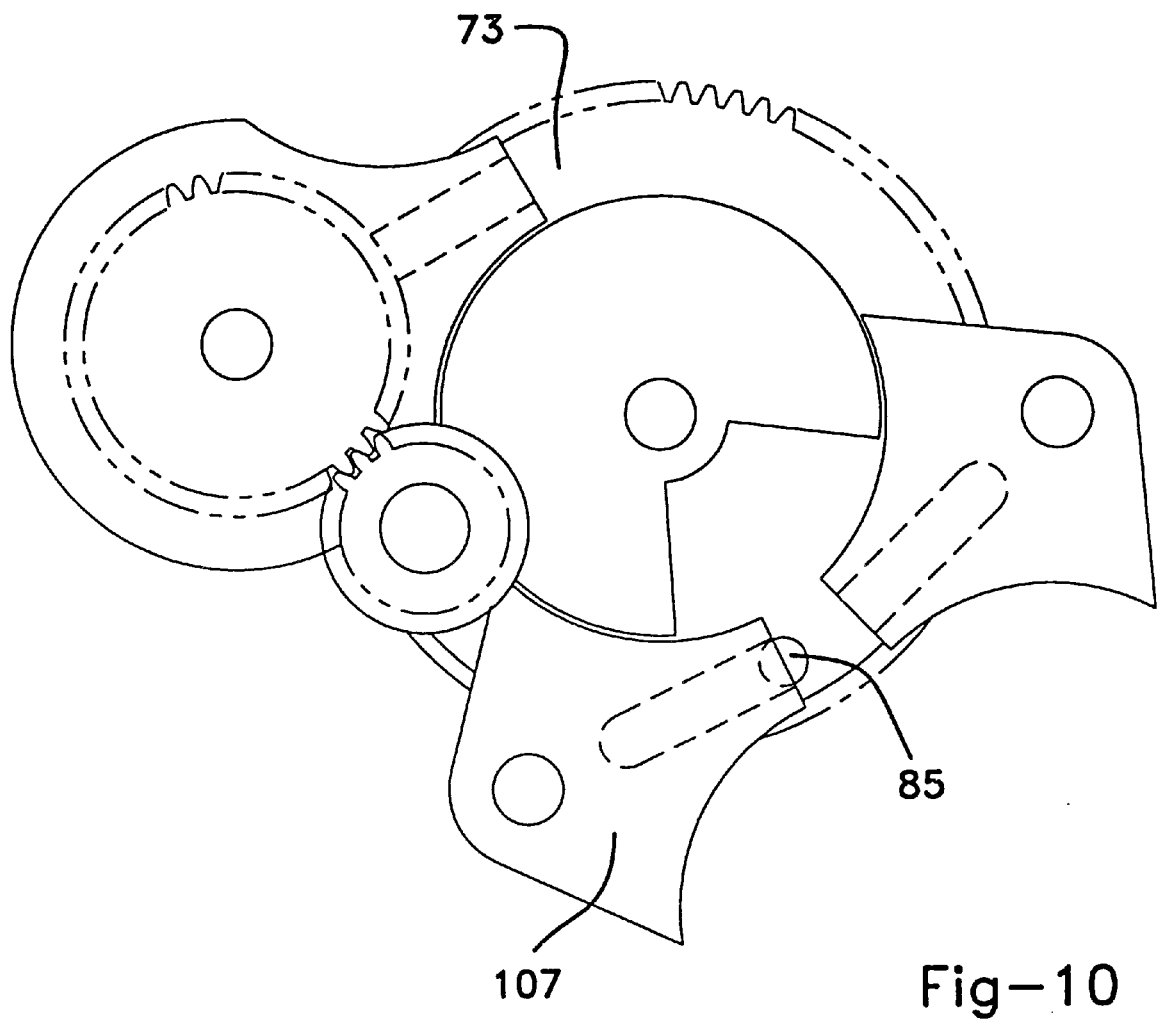
FIG. 10 is a diagrammatic rear view showing the power transmission assembly of the preferred embodiment multi-functional apparatus of the present invention at the beginning of a liftglass unlocking and release motion.
Figure 11:
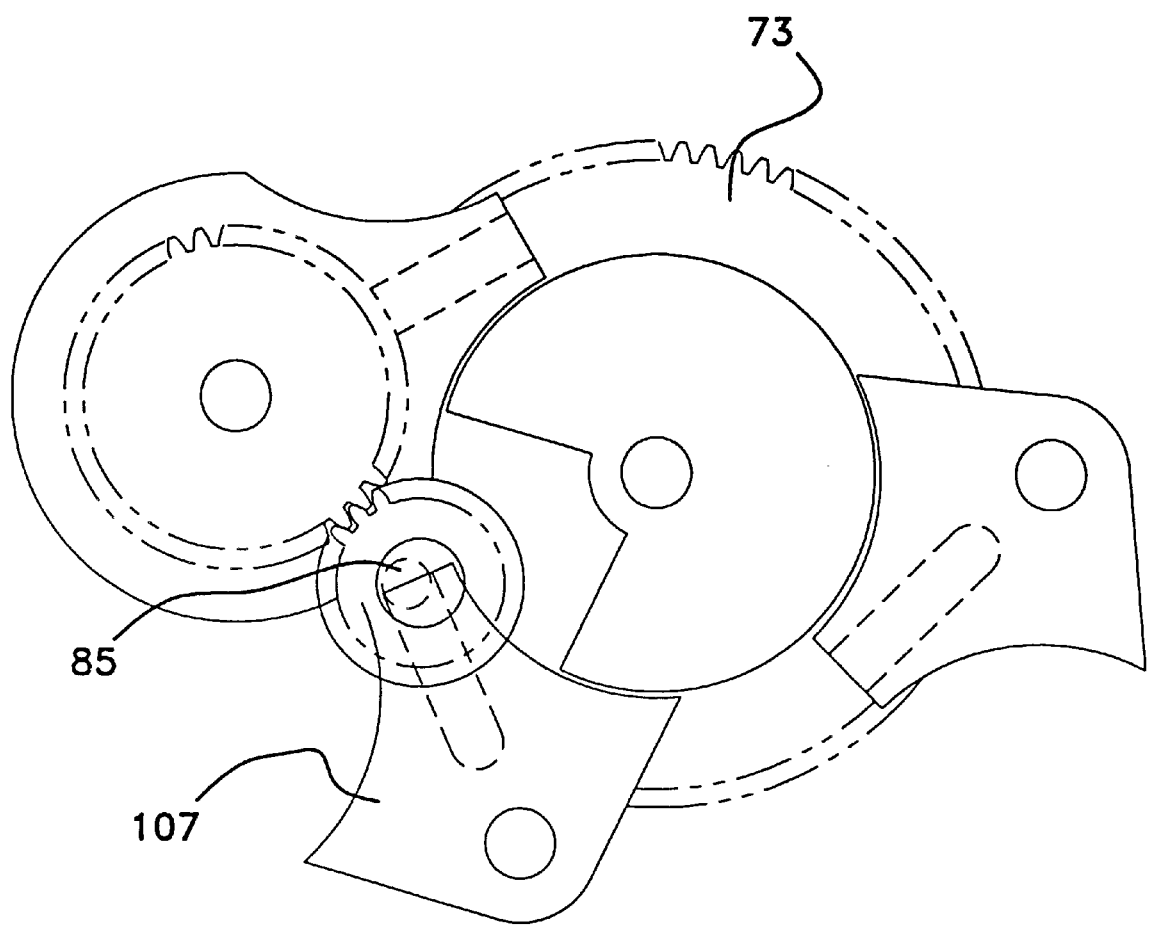
FIG. 11 is a diagrammatic rear view showing the power transmission assembly of the preferred embodiment multi-functional apparatus of the present invention at the completion of the liftglass unlocking and release motion.

In FIG. 10, helical gear 73 and drive pin 85 are shown rotated to the beginning of a liftgate window release positional range 112 (see FIG. 12). In this position, drive pin 85 engages cam 107. Helical gear 73, drive pin 85 and cam 107 are then rotated to the completion of the liftgate window release range 211 (see FIG. 12) as is shown in FIG. 11. This causes the couplings and window release lock 47 (see FIG. 1) to move from a locked orientation to an unlocked orientation. After a pauses motor 51 (see FIG. 2) is automatically reversed. Of course, it will be appreciated that the previously discussed positional ranges may have alternate patterns and arrangements, and may include additional or replacement functions.

Figure 13A:
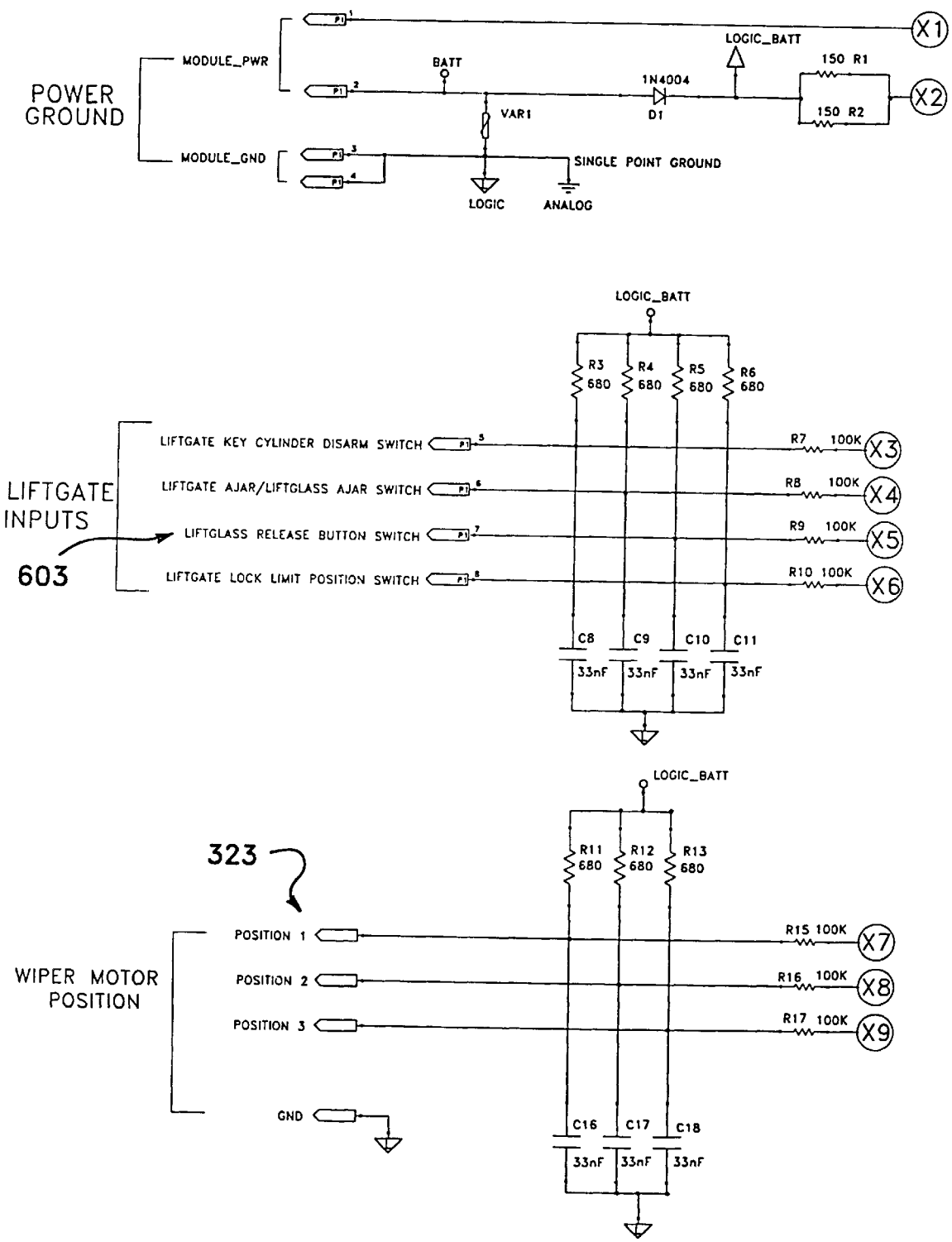
FIGS. 13a–13c are electrical schematic diagrams showing a rear node for controlling the preferred embodiment of the present invention multi-functional apparatus.
Figure 13B:
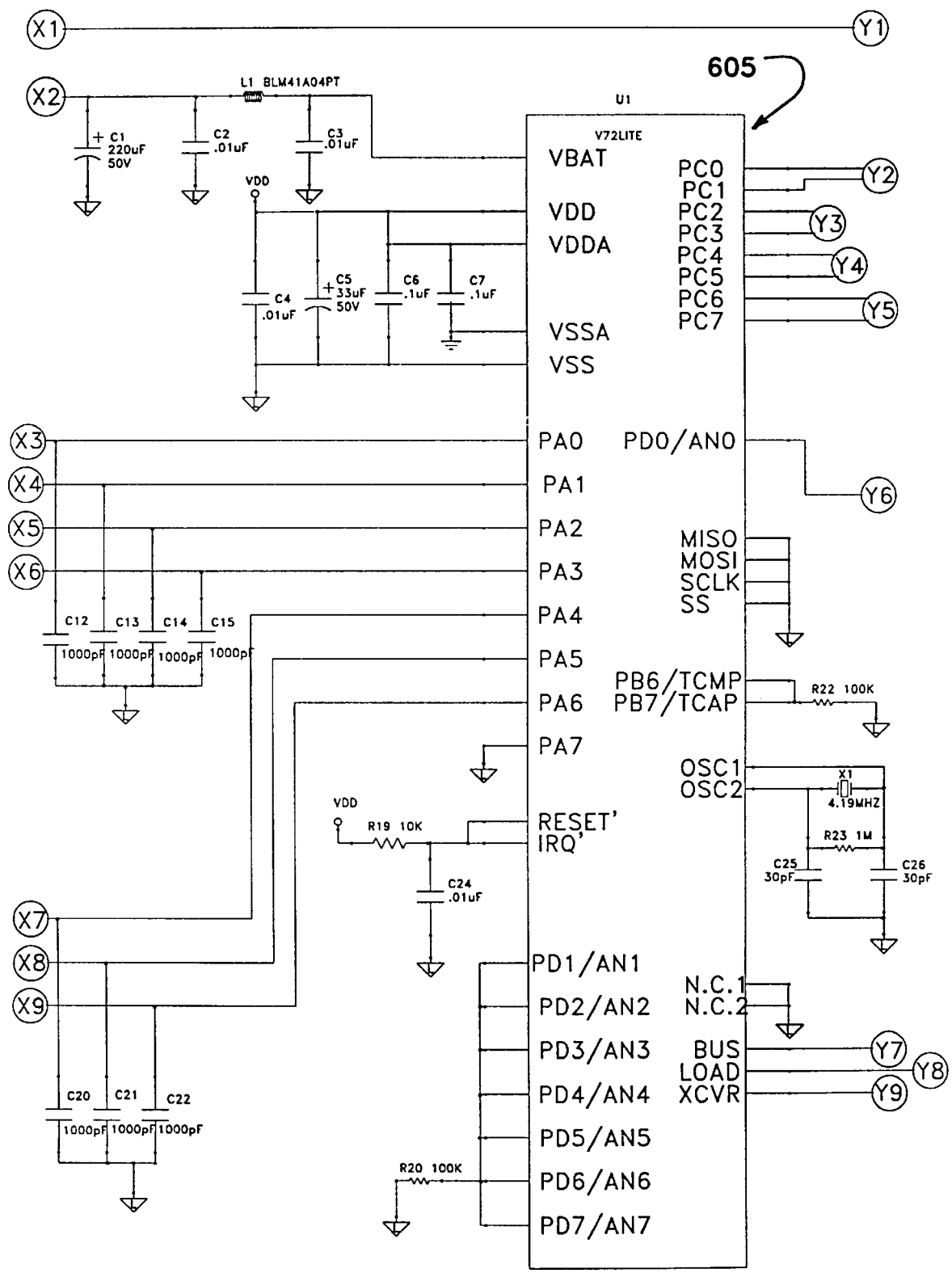
Figure 13C:
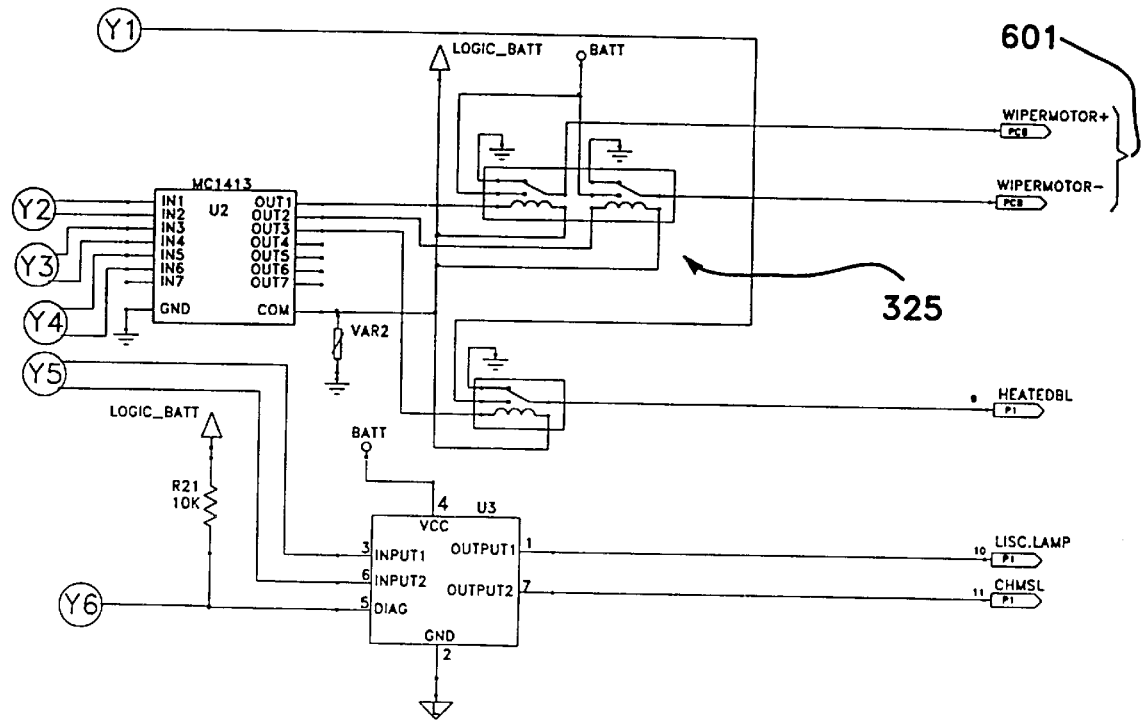
Figure 13C:
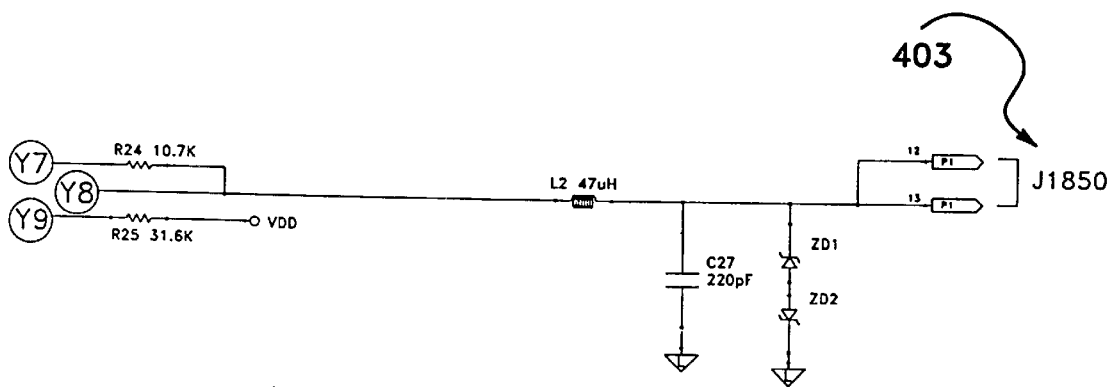

As can best be observed in FIGS. 13a–c an electronic control unit includes a rear node microprocessor 605 preferably using a Motorola MC68HC05V6 (or alternately MC68HC05V7) chip mounted upon a rigid printed circuit board. Rear node electronic control unit is electrically connected to a central body microprocessor or control unit (not shown) in a multiplexed (MUX) fashion through a wire harness 403. A J1850 MUX protocol is used. Microprocessor 605 allows for energization of motor 51 (see FIG. 2) through leads 601 in response to various wiper activation inputs received from the main body microprocessor, a liftgate mounted lock switch 351, a liftgate mounted liftglass release button switch 603 and various other ajar and positional switches. Three active electrical contactors 323 plus a common ground ride against the conductive pattern of feedback disk 89 (see FIG. 12) for sensing the rotational position of helical gear 73 and motor 51 (see FIG. 2). Rear node microprocessor 605 will translate the monostropic code (i.e.: requiring only a single bit to change when feedback disk 89 passes from any positional range to an adjacent positional range) pattern input signals from contactors 323 into a gray binary code. Upon reaching the completion of the window wipe positional range, upon reaching the completion of the liftgate window release positional range or upon receiving a vehicle occupant created signal from the central body microprocessor, rear node microprocessor 605 will actuate a normally closed relay 325 allowing for a reversal of the electrical polarity, and thus rotational direction of the armature 57 within motor 51 (see FIG. 2). it should be noted that a lost motion mechanism may be required for allowing manual key-induced overriding of the lock mechanisms.

Figure 14:
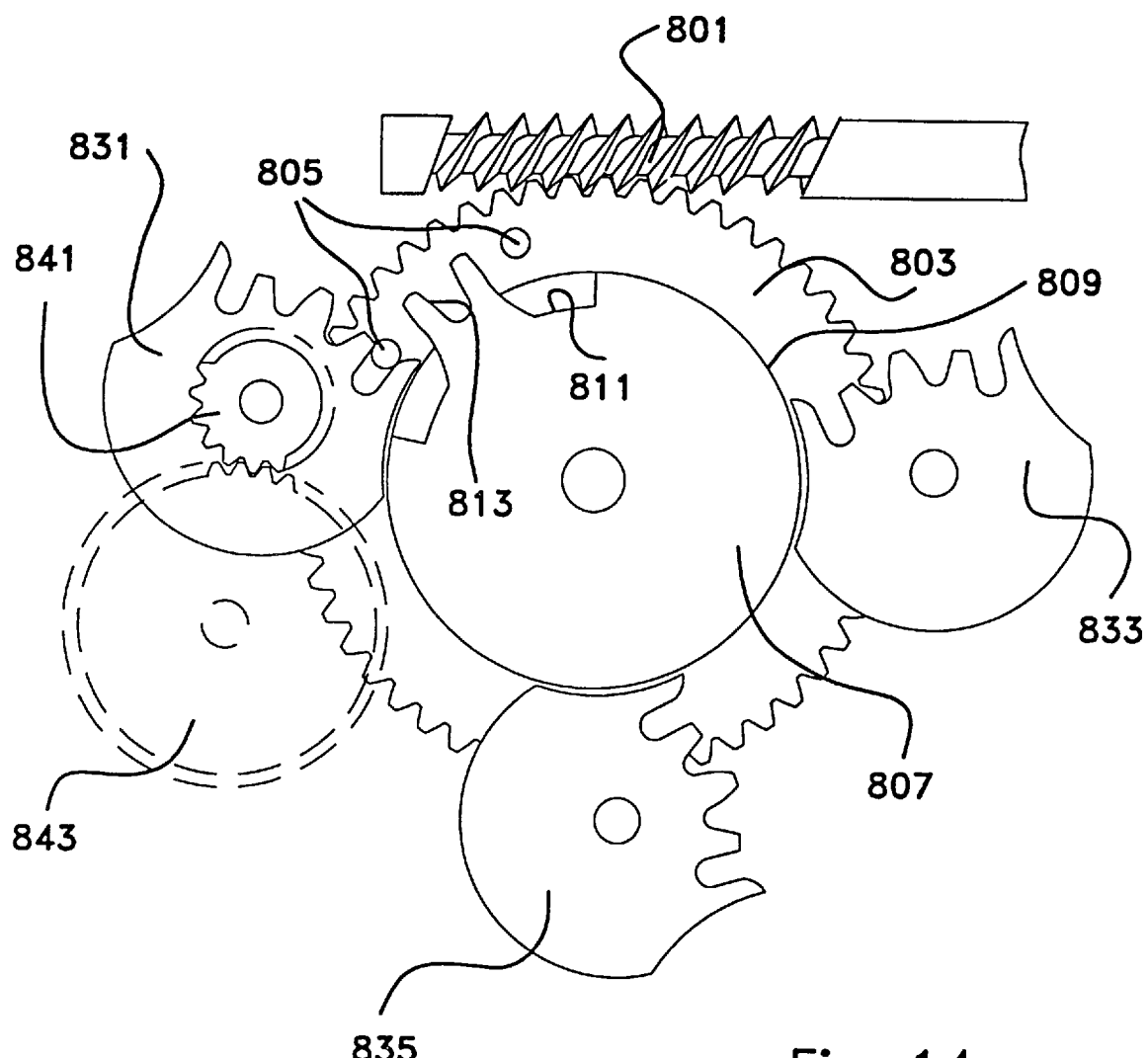
FIG. 14 is a diagrammatic rear elevational view showing a first alternate embodiment of the multi-functional apparatus of the present invention.

A first alternate embodiment of the multi-functional apparatus of the present invention is partially shown in FIG. 14. In this embodiment, a worm gear segment 801 of a fractional horsepower, do electric motor armature drives a helical gear 803 enmeshed therewith. A pair of drive pins 805 project from a face of helical gear 803. A drum 807 having a partially circular peripheral surface 809 with a pair of indentations 811 is coaxially mounted upon helical gear 803 for rotation therewith. Drum 807 further has a bifurcated fork 813 radially projecting therefrom and extending between the pair of drive pins 805. This embodiment also employs three starwheel-type intermittent rotary motion mechanisms 831, 833 and 835. A spur gear 841 is stacked upon starwheel mechanism 831 for rotation therewith. Spur gear 841 rotatably drives a pinion gear 843 which is engaged with a wiper shaft. Drive pins 805 and bifurcated fork 813 can be selectively rotated by the motor to engage with the teeth of the desired starwheel mechanism. Otherwise, this embodiment functions the same as the preferred embodiment.

Figure 15:
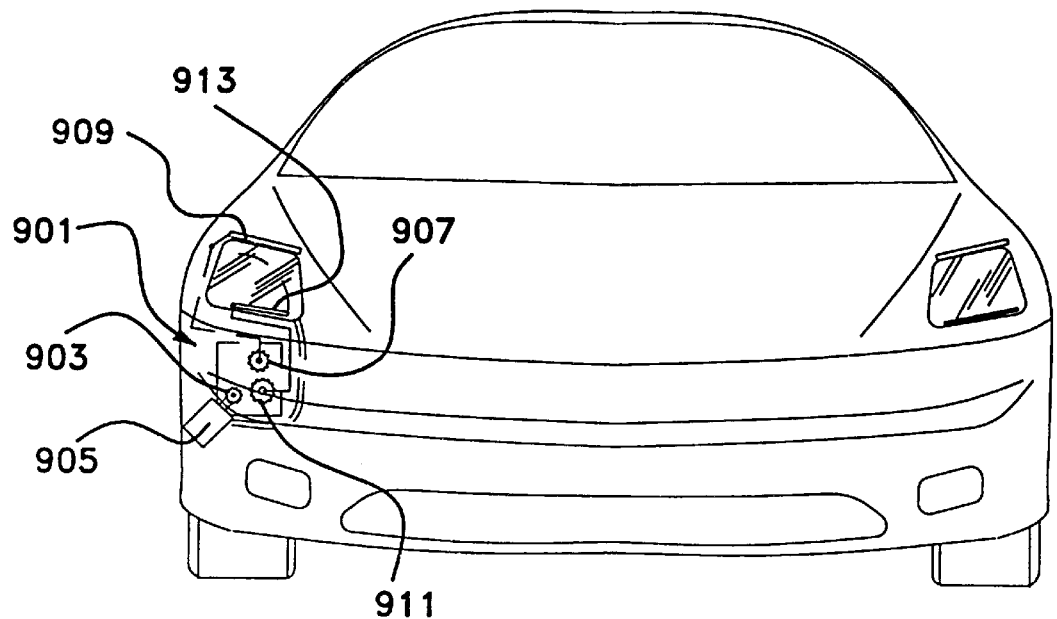
FIG. 15 is a diagrammatic front view showing a second alternate embodiment of the present invention multi-functional apparatus.

A second alternate embodiment is shown in FIG. 15. A multi-functional apparatus of the present invention employs a drive and power transmission unit 901 like that of the preferred embodiment to selectively and intermittently drive an output gear 903 which operates a headlamp washer fluid pump. Such a washer pump is disclosed within the following U.S. Patents: U.S. Pat. Nos. 4,173,055 entitled "Windshield Washer Pump Drive Mechanism" which issued to Izumi et al. on Nov. 6, 1979; and 3,574,882 entitled "Windshield Washer Pump Assembly" which issued to Petry on Apr. 13, 1971; both of which are incorporated by reference herewithin. A second intermittent motion mechanism selectively drives a second output gear 907 which moves a headlamp mechanism 909. Such a headlamp mechanism can comprise a rotatable headlamp cover having a pivoting cammed surface with gear teeth thereon. Alternately, the headlamp mechanism may consist of a retractable headlamp and bracket assembly such as those disclosed within U.S. Pat. No. 5,355,286 entitled "Retractable Headlamp Assembly" which issued to Flint et al. on Oct. 11, 1994; and U.S. Pat. No. 5,251,114 entitled "Actuator for Controlling the Orientation of a Motor Vehicle Headlamp" which issued to Cantin et al. on Oct. 5, 1993; both of which are incorporated by references herewithin. A third intermittent motion mechanism selectively drives a third output gear 911. This output gear 911 serves to rotate a headlamp wiper assembly 913 in a cyclically oscillating manner. A front node electronic control unit controls the actuation of an electric motor to selectively drive the intermittent motion mechanisms. The output gears may need to be of a bevel gear variety due to differently angled driven devices.

Figure 16:
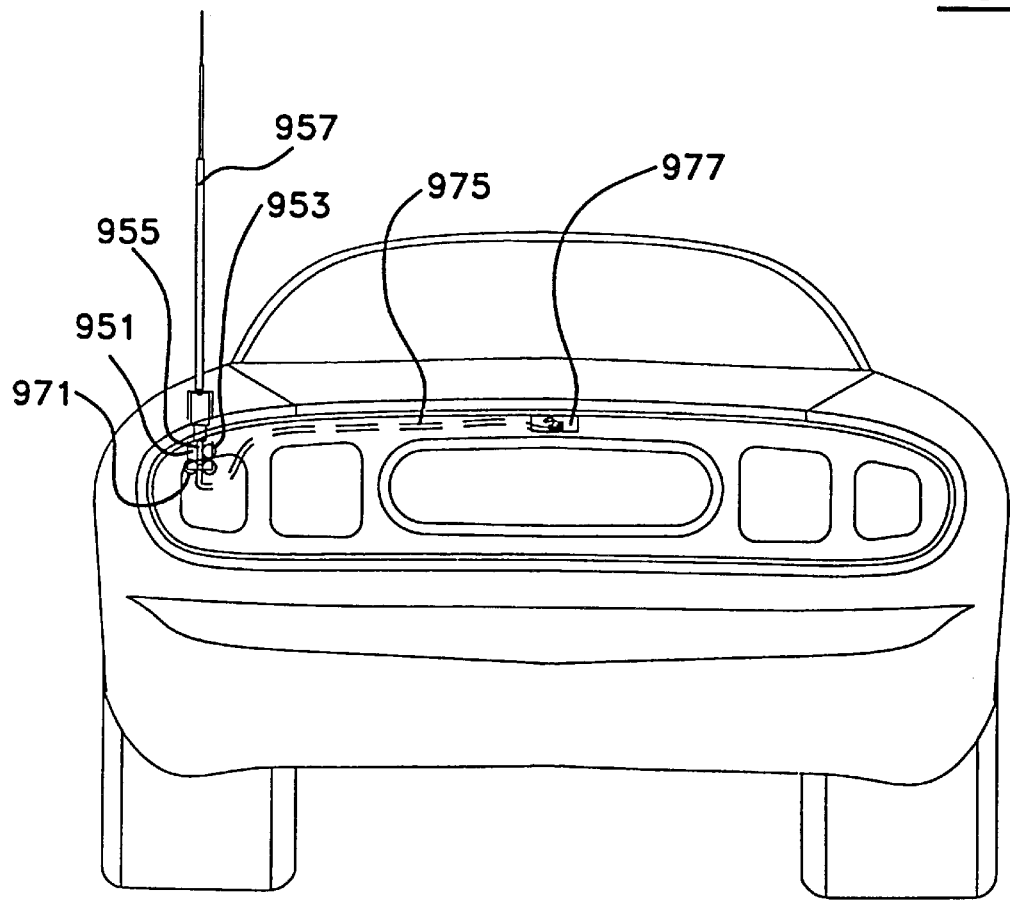
FIG. 16 is a diagrammatic rear view showing a third alternate embodiment of the multi-functional apparatus of the present invention.

A third alternate embodiment of the present invention multi-functional apparatus is shown in FIG. 16. A drive and power transmission unit 951, similar to that of the preferred embodiment, is disposed within a trunk of an automotive vehicle. A do electric motor is selectively driven by a rear node electronic control unit to selectively activate a first intermittent motion mechanism. This first intermittent motion mechanism drives an output mechanism or pulley 953 which, in turn, moves a cable 955 to extend and retract a telescoping antenna 957. Examples of such telescoping antennas are disclosed within the following U.S. Patents: U.S. Pat. Nos. 3,803,627 entitled "Motor-Driven, Telescoping Antenna for Automobiles" which issued to Schuscheng on Apr. 9, 1974; and 2,926,351 entitled "Power-Operated Antenna" which issued to Wise on Feb. 23, 1960; the disclosures of which are incorporated by reference herewithin. The motor also selectively operates a second intermittent motion mechanism coupled to a pulley assembly 971 for moving a coupling such as a cable 975. Cable 975 is coupled to a trunk lock 977. Other coupling means may of course be employed. A fuel filler door lock and rear window wiper may also be coupled to the present invention multi-functional apparatus through intermittent motion mechanisms.

While various embodiments of this multi-functional apparatus have been disclosed, it will be appreciated that various modifications may be made without departing from the present invention. For example, a solenoid, electromagnet or other electromagnetic devices may be used in place of the previously described electric motor. Furthermore, additional spur gears, pinion gears, sector gears, planetary gears, jack screws, sprockets and chains, pulleys and belts, cables or other force transmitting means may be employed to couple between the electromagnetic device, rotatable member, intermittent motion mechanisms or locks. Moreover, a multiple gear transmission, linkage, belt or cable system can alternately couple a wiper assembly to the wiper shaft. It will further be appreciated that a variety of other multiplexed or non-multiplexed, microprocessor or analog circuitry may be used to control the apparatus of the present invention. The intermittent motion mechanisms may also be accomplished by employing other known intermittent motion mechanisms such as more conventional Geneva mechanisms, intermittent gearing, escapements, ratchet mechanisms or other known selectively actuable devices. For example, reference should be made to the following U.S. patents which are incorporated by reference herewithin: U.S. Pat. Nos. 5,228,239 entitled "System for Automatically Opening and Closing Doors of Vehicles" which issued to Heo on Jul. 20, 1993; 4,352,299 entitled "Intermittent Motion Gear Apparatus" which issued to Riggs et al. on Oct. 5, 1982; 3,443,455 entitled "Intermittent Motion Device" which issued to Zugel on May 13, 1969; 3,443,442 entitled "Selectively Operable Intermittent Motion Apparatus" which issued to Schweihs on May 13, 1969; 3,442,146 entitled "Intermittent Rotary Motion" which issued to Simpson on May 6, 1969; and 3,421,380 entitled "Intermittent Motion Apparatus" which issued to Mansour on Jan. 14, 1969. The multi-functional apparatus of the present invention can further be employed for windshield wipers, side door locks or other automotive vehicle and non-automotive vehicle applications. Moreover, the present invention can operate a backlite wiper in a hatchback or fixed backlight sedan. While various materials, electronic components, circuits and force transmitting members have been disclosed, a variety of other such materials, electronic components, circuits and force transmitting devices may be used. It is intended by the following claims to cover these and any other departures from the disclosed embodiments which fall within the true spirit of this invention.

The invention claimed is:

1. A multi-functional apparatus comprising:
an antenna telescopically movable between an extended orientation and a retracted orientation;
an electromagnetic device;
an intermittent motion mechanism operably driven by said electromagnetic device when said electromagnetic device is energized a first amount; and a connector coupling said intermittent motion mechanism to said antenna whereby selective movement of said intermittent motion mechanism causes telescoping movement of said antenna, wherein said intermittent motion mechanism operably remains stationary when said electromagnetic device is energized a second amount.

2. The multi-functional apparatus of claim 1 further comprising a second intermittent motion mechanism selectively driven by said electromagnetic device.

3. The multi-functional apparatus of claim 2 further comprising a lock movable between a locked orientation and an unlocked orientation in response to movement of said second intermittent motion mechanism.

4. The multi-functional apparatus of claim 1 wherein said intermittent motion mechanism is a Geneva-type mechanism.

5. The multi-functional apparatus of claim 1 wherein said intermittent motion mechanism is a star wheel-type mechanism.

6. The multi-functional apparatus of claim 1 further comprising a rigid member, wherein said intermittent motion mechanism is a rotatable cam having a channel with a single open end operable to movably receive said rigid member.

7. An automotive vehicle multi-functional apparatus comprising:

an antenna member movable between an extended position and a retracted position;

a single electromagnetic device;

a locking member movable between a locking position and an unlocking position; and at least one intermittent motion mechanism selectively coupling at least one of said members to said single electromagnetic device;

whereby energization of said single electromagnetic device a first amount moves said antenna member and energization of said single electromagnetic device a second amount moves said locking member.

8. The multi-functional apparatus of claim 7 further comprising a third member movable when said single electromagnetic device is energized a third amount.

9. The multi-functional apparatus of claim 8 wherein said third member is a window wiper shaft.

10. The multi-functional apparatus of claim 7 wherein said intermittent motion mechanism is a rotatable cam having a channel with a single open end.

11. The multi-functional apparatus of claim 7 wherein said intermittent motion mechanism is a Geneva-type mechanism.

12. A multi-functional apparatus comprising:

an automotive vehicle antenna having a portion movable from a first position to a second position;

an actuatable mechanism remotely located away from said antenna having a member movable from a third position to a fourth position;

an electromagnetic device;

a first power transmitting device coupling said portion of said antenna to said electromagnetic device; and a second power transmitting device coupling said actuatable mechanism to said electromagnetic device;

said electromagnetic device being operable to selectively drive said portion of said antenna and said member of said actuatable mechanism.

13. The apparatus of claim 12 wherein said actuable mechanism is a door lock.

14. The apparatus of claim 13 wherein said door lock is a fuel filler door lock.

15. The apparatus of claim 12 wherein said actuable mechanism is a window wiper.

16. The apparatus of claim 12 wherein said actuable mechanism is a trunk lock.

17. The apparatus of claim 12 wherein said electromagnetic device is operable to move said portion of said antenna without concurrently moving said member of said actuatable mechanism.

18. The apparatus of claim 12 wherein at least one of said power transmitting devices is a cable.

19. The apparatus of claim 12 further comprising a multiplexed circuit selectively controlling operation of said electromagnetic device.

20. The apparatus of claim 12 further comprising an intermittent motion mechanism selectively coupling said electromagnetic device to at least one of said power transmitting devices.

* * * * *